United States Patent
Kikuchi et al.

(10) Patent No.: US 9,212,575 B2
(45) Date of Patent: Dec. 15, 2015

(54) GEAR DEVICE AND VEHICLE HAVING SAME MOUNTED THEREON

(75) Inventors: Takeshi Kikuchi, Fujisawa (JP); Naoya Ishikawa, Yokohama (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 14/118,521

(22) PCT Filed: May 10, 2012

(86) PCT No.: PCT/JP2012/062022
§ 371 (c)(1),
(2), (4) Date: Mar. 6, 2014

(87) PCT Pub. No.: WO2012/157522
PCT Pub. Date: Nov. 22, 2012

(65) Prior Publication Data
US 2014/0190428 A1 Jul. 10, 2014

(30) Foreign Application Priority Data
May 19, 2011 (JP) .................................. 2011-112003

(51) Int. Cl.
*F01P 11/00* (2006.01)
*F01M 5/00* (2006.01)
*F16H 57/04* (2010.01)

(52) U.S. Cl.
CPC ........... *F01M 5/005* (2013.01); *F16H 57/0413* (2013.01); *F16H 57/0417* (2013.01); *F16H 57/0447* (2013.01); *F16H 57/0475* (2013.01); *F16H 57/0449* (2013.01)

(58) Field of Classification Search
CPC . B60K 6/547; F16H 57/0413; F16H 57/0447; F16H 57/0449; F16H 57/0475; F01M 5/005
USPC ...... 123/41.55, 196 R, 196 AB, 41.57, 41.05, 123/41.58; 184/6.22, 6.12, 104.1; 74/467, 74/606 A
See application file for complete search history.

(56) References Cited

U.S. PATENT DOCUMENTS 4,041,697 A * 8/1977 Coffinberry et al. ........ 60/39.281
4,815,431 A * 3/1989 Yorita et al. ............ 123/196 AB (Continued)

FOREIGN PATENT DOCUMENTS

JP 5-33853 2/1993
JP 5-272621 10/1993

(Continued)

OTHER PUBLICATIONS

Patent Abstracts of Japan, Publication No. 2001-128304, Published May 11, 2001.

(Continued)

*Primary Examiner* — Lindsay Low
*Assistant Examiner* — Long T Tran
(74) *Attorney, Agent, or Firm* — Staas & Halsey LLP (57) ABSTRACT

A gear device in which lubricating oil for cooling and lubricating gears to be driven therein is adjusted to a temperature and an amount suitable for the speed of a vehicle, and a vehicle having the gear device mounted thereon. A transmission adjusts the temperature of lubricating oil by supplying the lubricating oil from a lower part of a housing of the transmission into a heat exchanger by a circulation pump and causing the lubricating oil and engine cooling water to exchange heat with each other in the heat exchanger. A level of the lubricating oil retained in an oil pan when the circulation pump is stopped is defined as a highest oil level, while the level of the lubricating oil retained in the oil pan when the amount of the lubricating oil pumped up by the circulation pump is maximum is defined as a lowest oil level. The heat exchanger is disposed at a position outside the housing and higher than the highest oil level. The transmission includes a device which controls the amount of the oil to be pumped up by the lubricating pump to adjust the height of the level of the oil which varies between the highest oil level and the lowest oil level.

9 Claims, 4 Drawing Sheets

(56) References Cited

U.S. PATENT DOCUMENTS

| | | | |
|---|---|---|---|
| 5,099,715 A * | 3/1992 | Baiker | 74/467 |
| 5,568,842 A * | 10/1996 | Otani | 184/6.22 |
| 6,899,074 B1 * | 5/2005 | Carlsson | 123/196 AB |
| 8,316,806 B2 * | 11/2012 | Soderberg et al. | 123/41.33 |
| 2010/0000475 A1 * | 1/2010 | Kardos et al. | 123/41.31 |
| 2010/0140020 A1 * | 6/2010 | Murahashi | 184/6.12 |
| 2012/0222647 A1 * | 9/2012 | Futonagane et al. | 123/196 AB |
| 2013/0121849 A1 * | 5/2013 | Long et al. | 417/53 |

FOREIGN PATENT DOCUMENTS

| | | |
|---|---|---|
| JP | 06-315206 | 11/1994 |
| JP | 11-264318 | 9/1999 |
| JP | 2001-128304 | 5/2001 |
| JP | 2007-321927 | 12/2007 |
| JP | 2010-196852 | 9/2010 |

OTHER PUBLICATIONS

Patent Abstracts of Japan, Publication No. 06-315206, Published Nov. 8, 1994.
International Search Report dated Jul. 10, 2012 in PCT/JP2012/062022.
English translation of Japanese Utility Model Application No. 177757/1983 (Laid-open No. 84710/1985) Published Jun. 11, 1985.
Patent Abstracts of Japan, Publication No. 05-033853, Published Feb. 9, 1993.
Patent Abstracts of Japan, Publication No. 2007-321927, Published Dec. 13, 2007.
Patent Abstracts of Japan, Publication No. 05-272621, Published Oct. 19, 1993.

* cited by examiner

GEAR DEVICE AND VEHICLE HAVING SAME MOUNTED THEREON

CROSS REFERENCE TO THE RELATED APPLICATIONS

This application claims the benefit under 35 U.S.C. Section 371, of PCT International Application No. PCT/JP2012/062022, filed May 10, 2012, and under 35 U.S.C. §119 of Japanese Application No. 2011-112003 filed May 19, 2011, the contents of which are incorporated herein by reference.

TECHNICAL FIELD

The present invention relates to a gear device which controls the temperature and the amount of lubricating oil with a configuration requiring a fewer number of components, and to a vehicle having the gear device mounted thereon.

BACKGROUND ART

Generally, in gear devices such as transmissions (gear boxes) and differential gears (differential arrangements), mechanisms are lubricated and cooled down by being supplied with gear oil (lubricating oil). The lubrication with the gear oil provides the effect of forming oil films over the mechanisms, which reduces friction between metal pieces and allows smooth movement. The cooling provides the effect of absorbing heat produced by friction and the like and transmitting that heat to the outside.

However, the gear oil is high in viscosity in order to maintain itself as an oil film. This viscosity has such a property that the higher the temperature, the lower the viscosity becomes. Thus, the gear oil at a low temperature has such high viscosity that a vehicle has a drive loss due to an increase in friction (frictional resistance). This has been one of the causes that deteriorates fuel efficiency.

On the other hand, reduction in fuel consumption of vehicles has been advanced rapidly in view of energy saving. Here, in achieving energy saving, it is an important issue to reduce the friction caused by the gear oil at a low temperature to improve the fuel efficiency of a vehicle.

Conventionally, warm-up of a gear device such as a transmission (gear box) or a differential gear (differential arrangement) has been done naturally by temperature raise through friction between gears' tooth surfaces, a lubricating oil, churning energy of the lubricating oil, or transmission of heat from an engine (internal combustion engine). Thus, the gear device includes no exclusive device to accelerate the warm-up. Moreover, the gear device is filled with a specified amount of oil inside its housing (enclosure), and the lubrication and the cooling are done with components dipped in the oil. Thus, a drive loss resulting from the churning resistance is increased. As a result, the fuel efficiency is deteriorated.

The viscous resistance of the lubricating oil cannot be ignored particularly in the case of cold start of the engine from a state where the temperature of cooling water and the temperature of the lubricating oil are low. In terms of the amount of fuel injected during idle, for example, the cold start requires more fuel than hot start in order to make the engine idle speed stable at a preset value. Since transmissions and differential gears are distant from their engines which are heat sources, it takes time to raise the temperature of the oil, and hence the driving resistance cannot be easily reduced. Accordingly, the fuel efficiency is deteriorated. Such an influence is remarkable when the ambient temperature is low. Thus, the temperature of the lubricating oil in transmissions needs to be raised quickly.

To this end, there is a device which introduces oil into a heat exchanger where the oil is heated by cooling water immediately after an outlet in an engine when the temperature of the oil in the transmission is low, whereas the oil is cooled down by the cooling water before being heated by the engine when the temperature of the oil is high (see Patent Document 1, for example). However, only heating with a heat exchanger cannot provide a solution for quickly raising the temperature of the oil especially at cold start.

Meanwhile, there is an oil temperature control device which includes a heat exchanger for heat exchange of lubricating oil, an oil temperature sensor that measures the temperature of the oil in the transmission, and an oil control valve that controls the flow rate of the lubricating oil, and which controls the temperature of the oil by controlling the amount of the oil into the heat exchanger with the oil control valve (see Patent Document 2, for example). However, this device is a control device for a situation where the temperature of the oil has become high, and is not a control device for proactively raising the temperature of the oil. Thus, the device cannot reduce friction caused by the lubricating oil at a low temperature.

PRIOR ART DOCUMENT

Patent Document 1: Japanese patent application Kokai publication No. Hei 11-264318
Patent Document 2: Japanese patent application Kokai publication No. 2010-196852

SUMMARY OF THE INVENTION

The present invention has been made in view of the above problem, and objects thereof are to provide a gear device capable of achieving low fuel consumption by reducing a drive loss with a synergistic effect of quickly raising the temperature of the lubricating oil to lower the viscous resistance thereof while reducing the amount of the oil when the temperature of the oil is low, through control on the temperature and the amount of the oil using a configuration requiring a fewer number of components than conventional practices, and to provide a vehicle having the gear device mounted thereon.

A gear device for achieving the above objects is a gear device which adjusts a temperature of lubricating oil by supplying the lubricating oil from a lower part of an enclosure of the gear device into a heat exchanger by a circulation pump and causing the lubricating oil and cooling water for an internal combustion engine to exchange heat with each other in the heat exchanger, in which: a level of the lubricating oil retained in the lower part when the circulation pump is stopped is defined as a highest oil level, while the level of the lubricating oil retained in the lower part when an amount of the lubricating oil pumped up by the circulation pump is maximum is defined as a lowest oil level; the heat exchanger is disposed at a position outside the enclosure and higher than the highest oil level; and the gear device includes a control device which controls the amount of the oil to be pumped up by the circulation pump to adjust a height of the level of the oil which varies between the highest oil level and the lowest oil level.

According to this configuration, the pumping amount of the circulation pump is controlled according to the temperature of the lubricating oil so as to optimize the height of the level of the lubricating oil inside the housing (enclosure), and the oil is pumped up to the heat exchanger disposed at a position higher than the level of the oil. In this way, the lubricating oil separated away from the transmission housing can exchange heat with the cooling water for the engine (internal combustion engine). Thus, the above configuration functions to raise the temperature of the lubricating oil when it is cold and functions to lower the temperature of the lubricating oil when it is hot, by using the temperature of the engine cooling water. Particularly, when the lubricating oil is cold, heat exchange is performed with the cooling water overheated by the engine, so that the temperature of the oil is raised quickly and the viscous resistance thereof is reduced, and also the amount of the lubricating oil is reduced. These reductions provide a synergistic effect of reducing a drive loss. Thus, low fuel consumption can be achieved.

Moreover, the heat exchanger into which the lubricating oil is delivered is disposed at a position higher than the height of the level of the oil in the gear device. Thus, when the circulation pump is stopped, the level of the oil can be held at a normal oil level. When the circulation pump is operating, the lubricating oil is pumped up above the level of the oil as much as the internal volume of the heat exchanger or a volume corresponding to the lifting ability of the circulation pump, and therefore the level of the oil inside the gear device can be lowered. There is no need to provide complicated mechanisms such as a valve for adjusting the amount of the oil. The height of the level of the oil can be adjusted simply by changing the pumping amount of the circulation pump, i.e. the number of rotations of the circulation pump.

Moreover, the above gear device further includes: a vehicle speed sensor which detects a speed of a vehicle equipped with the gear device; an oil temperature sensor which detects the temperature of the lubricating oil; and an oil amount level sensor which detects the height of the level of the oil, and the control device includes a device for controlling the amount of the oil to be pumped up so as to adjust the temperature of the oil and the height of the level of the oil according to the speed of the vehicle.

According to this configuration, the pumping amount of the circulation pump can be controlled to obtain the optimum amount of the oil for the speed of the vehicle (the number of rotations of a top gear shaft). Moreover, the pumping amount of the circulation pump is controlled such that the height of the level of the oil is maintained always above the lowest oil level. In this way, it is possible to prevent lack of oil films due to suction of air.

In addition, in the above gear device, the cooling water is cooling water heated by the internal combustion engine, and the control device includes a device for controlling the amount of the oil to be pumped up so as to raise the temperature of the oil and lower the level of the oil to a vicinity of the lowest oil level at cold start of the internal combustion engine.

In the case of cold start of the vehicle from a state where the temperature of the water and the temperature of the oil are low, it takes time to raise the temperature of the oil because transmissions and differential gears are distant from a heat source. According to the above configuration, the pumping amount of the circulation pump is controlled based on measurement of the temperature of the oil. Thus, the level of the oil is maintained at the optimum level for avoiding unnecessary cooling, that is, the height of the level of the oil is lowered to a vicinity of the lowest oil level. Further, the temperature of the oil is quickly raised to reduce the viscous resistance of the oil. Accordingly, the fuel efficiency can be improved.

Furthermore, a vehicle for achieving the above object has the above gear device mounted thereon. According to this configuration, the same operations and effects as those described above can be achieved.

Effect of the Invention

According to the present invention, it is possible to achieve low fuel consumption by reducing a drive loss with a synergistic effect of quickly raising the temperature of the lubricating oil to lower the viscous resistance thereof while reducing the amount of the oil when the temperature of the oil is low, through control on the temperature and the amount of the oil using a configuration requiring a fewer number of components than conventional practices.

DESCRIPTION OF THE EMBODIMENTS

Hereinbelow, a gear device and a vehicle of an embodiment according to the present invention will be described with reference to the drawings. The gear device of the embodiment according to the present invention is a general transmission that is mounted on a vehicle, and therefore illustration and description of the configuration of the transmission are omitted. Moreover, the gear device of the embodiment according to the present invention is not limited to manual transmissions, automatic transmissions, and semi-automatic transmissions but is applicable to devices in which gears and lubricating oil are present such as differential gears.

Figure 1:
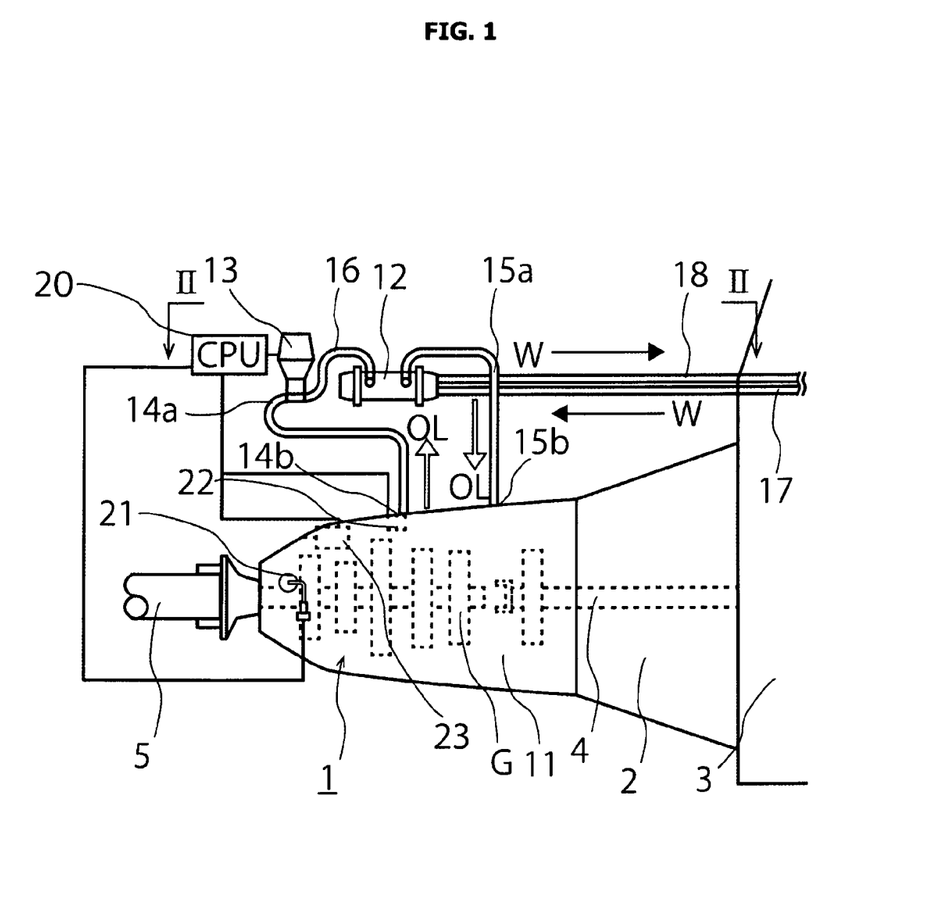
FIG. 1 is a plan view showing a gear device of an embodiment according to the present invention.

As shown in FIG. 1, a gear device 1 is a transmission and transmits power of an engine (internal combustion engine) 3 from a shaft 4 through a clutch 2 to a shaft 5 after changing the speed with gears G included inside the gear device 1. The transmission (gear device) 1 includes a heat exchanger 12, a circulation pump 13, lubricating oil pipes 14a, 15a, and 16, and engine-cooling-water pipes 17 and 18 outside a housing (enclosure) 11 having the multiple gears G therein. The transmission 1 also includes a control device 20, a vehicle speed sensor 21, an oil temperature sensor 22, and an oil amount level sensor 23. Here, the hollow arrows indicate the flow of lubricating oil OL, and other arrows indicate the flow of engine cooling water W.

Figure 2:
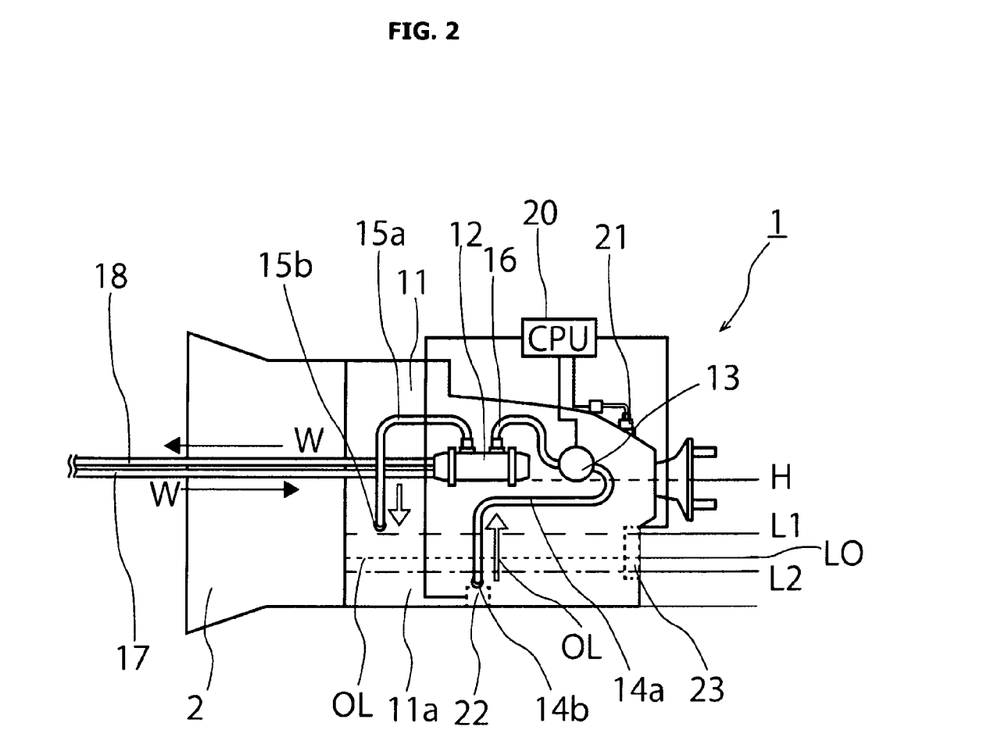
FIG. 2 is a side view showing a view from line II-II in FIG. 1.

As shown in FIG. 2, there are an outlet 14b for the lubricating oil OL from the housing 11 and an inlet 15b for the lubricating oil OL into the housing 11. An oil pan 11a in which to retain the lubricating oil OL is provided in a lower part of the housing 11. Moreover, the height of a level LO of the oil when the circulation pump 13 is stopped, that is, when the amount of the lubricating oil OL retained in the oil pan 11a is maximum, is defined as a highest oil level L1. The height of the level LO of the oil when the amount of the lubricating oil OL pumped up by the circulation pump 13 is maximum, that is, when the amount of the lubricating oil OL retained in the oil pan 11a is minimum, is defined as a lowest oil level L2.

The heat exchanger 12 is connected to the first engine cooling water pipe 17 and the second engine cooling water pipe 18 so that the lubricating oil OL can be heated or cooled by the engine cooling water W. The first engine cooling water pipe 17 is a pipe into which the engine cooling water W flows from the engine 3. The second engine cooling water pipe 18 is a pipe from which the engine cooling water W after heat exchange in the heat exchanger 12 flows out. Meanwhile, the heat exchanger 12 is disposed at a height H outside the housing 11. This height H simply needs to be higher than the level LO of the lubricating oil OL and is therefore set higher than the highest oil level L1. As the heat exchanger 12, it is possible to use, for example, a double-pipe heat exchanger, a spiral heat exchanger, a plate heat exchanger, a tank jacket heat exchanger, or the like, as long as it has a configuration that allows heat exchange between the lubricating oil OL and the engine cooling water.

The circulation pump 13 is formed of a rotary pump capable of adjusting the amount of oil through rotations of a gear- or screw-type rotor and is configured to pump up the lubricating oil OL retained in the oil pan 11a to the heat exchanger 12. This circulation pump 13 is a pump that continuously feeds liquid through rotations of the rotor inside its casing. It is very simple, including no valve with a complicated mechanism and the like, and is capable of generating high pressure by rotating at high speed. Moreover, the flow rate of the lubricating oil OL can be adjusted by controlling the rotor's rotations. The circulation pump 13 is not limited to the above configuration, and a reciprocating pump or the like can be used instead.

The outlet 14b for the lubricating oil OL is disposed at a position lower than the lowest oil level L2. Disposing the outlet 14b at a position lower than the lowest oil level L2 prevents entrance of air into the outlet 14b, thereby making it possible to prevent malfunction of the circulation pump 13 and the like. Moreover, the inlet 15b for the lubricating oil OL is disposed at a position higher than the highest oil level L1. When the lubricating oil OL is returned into the housing 11, it is preferable to return the lubricating oil OL into the oil pan 11a along the inner wall of the housing 11. By such a configuration, it is possible to prevent cavitation inside the lubricating oil OL.

The control device 20, like personal computers, includes communication means, storage means, and so on. It is connected to the vehicle speed sensor 21, the oil temperature sensor 22, and the oil amount level sensor 23 and is configured to receive data detected by each sensor and control the circulation pump 13 based on that data. In the case of the configuration described above, the control device 20 can be provided anywhere inside its vehicle. In recent vehicles, various kinds of electronic control are performed, and the control device 20 may be installed as one of these kinds of electronic control.

The vehicle speed sensor 21 is formed of a wire sensor or an electromagnetic sensor. This sensor is a sensor that detects the number of rotations of a top gear shaft (not shown) and calculates the speed of the vehicle from the gear ratio. Alternatively, it is possible to use a method of calculating the speed of the vehicle by detecting the number of rotations of the engine 3 by means of a crank angle sensor provided to the engine 3, a method of calculating the speed of the vehicle by using a vehicle speed sensor provided to the shaft 5 or the root of a drive wheel (not shown), or the like.

The oil temperature sensor 22 is provided near the outlet 14b for the lubricating oil OL, and is formed of a mechanical oil temperature meter which displays the temperature of the oil by drawing the oil directly into a meter, or an electromagnetic oil temperature meter which displays the temperature of the lubricating oil OL on an electric meter based on increase and decrease in the resistance value of a sensor. The oil temperature sensor 22 is preferably provided inside the oil pan 11a in such a location as to be always under the lubricating oil OL.

The oil amount level sensor 23 is provided inside the housing 11. As this oil amount level sensor 23, it is possible to use a floating level sensor, an electromagnetic level sensor, a bubbler level sensor, an optical interface level sensor, an ultrasonic level sensor, a tuning-fork level sensor, or the like. This oil amount level sensor 23 detects the level LO of the oil.

The vehicle speed sensor 21, the oil temperature sensor 22, and the oil amount level sensor 23 are usually mounted in vehicles. Using these originally mounted sensors eliminates the need to provide additional sensors.

Operations of the above transmission 1 will be described. The control device 20 calculates the optimum oil temperature and the optimum oil amount (the optimum height of the level LO of the oil inside the housing 11) for the speed of the vehicle or the number of rotations of the top gear shaft detected by the vehicle speed sensor 21. The control device 20 compares the optimum oil temperature and the optimum oil amount with the temperature of the oil detected by the oil temperature sensor 22 and the amount of the oil detected by the oil amount level sensor 23 to determine the number of times by which to rotate the rotor of the circulation pump 13 which is a rotary pump. The circulation pump 13 rotates its rotor the number of times determined by the control device 20 to pump up the lubricating oil OL. The lubricating oil OL thus pumped up exchanges heat with the engine cooling water W in the heat exchanger 12 and is returned to the oil pan 11a inside the housing 11.

The control device 20 controls the amount by which to pump up the lubricating oil OL to adjust the height of the level LO of the oil in the oil pan 11a between the highest oil level L1 and the lowest oil level L2 based on the speed of the vehicle and the temperature of the oil. For example, when the temperature of the lubricating oil OL is low and the viscous resistance thereof is high, the lubricating oil OL is pumped up to the heat exchanger 12 so as to increase the temperature of the oil. Here, a large amount of the lubricating oil OL is pumped up to reduce the amount of the lubricating oil OL high in viscous resistance inside the housing 11 so as to lower the stirring resistance against the gears G. Moreover, when the temperature of the lubricating oil OL is high, the lubricating oil OL is pumped up to the heat exchanger 12 so as to lower the temperature of the oil. Here, the pumping amount is set low to leave a large amount of the lubricating oil OL inside the housing 11 so as to secure the lubricating performance.

By the above operations, the number of rotations of the circulation pump 13 is controlled to pump up the lubricating oil OL to the heat exchanger 12, disposed at a position higher than the highest oil level L1, so as to obtain the optimum oil temperature and the optimum height of the level LO of the oil for the speed of the vehicle or the number of rotations of the top gear shaft. Thus, the lubricating oil OL separated away from the housing 11 can exchange heat with the engine cooling water W, and the temperature of the lubricating oil OL can therefore be adjusted according to the temperature of the cooling water W.

Generally, the temperature of the cooling water W is controlled to be approximately 60° C. to 90° C., and this is effective particularly in warming up the engine. Thus, when the temperature of the lubricating oil OL is low and the viscous resistance thereof is high, the increase in the temperature of the oil is accelerated to reduce the viscous resistance, while the amount of the oil inside the housing 11 is reduced at the same time. A synergistic effect of these reductions reduces a drive loss. Accordingly, low fuel consumption can be achieved. Meanwhile, the adjustment of the temperature of the lubricating oil OL by the temperature of the engine cooling water W also brings about an advantageous effect of preventing the lubricating oil OL from becoming too hot.

Moreover, the heat exchanger 12 is disposed at a position higher than the highest oil level L1, and the lubricating oil OL is pumped up above the level LO of the oil, as much as the internal volume of the heat exchanger 12 or a volume corresponding to the lifting ability of the circulation pump 13. Thus, the oil amount adjustment can be controlled simply by adjusting the pumping amount of the circulation pump 13. Accordingly, the number of components is reduced. In addition, the number of rotations of the circulation pump 13 can be controlled such that the level LO of the oil falls between the highest oil level L1 and the lowest oil level L2. Particularly, the lowest position of the level LO of the oil can be controlled so that the lubricating oil OL is always in contact with the gears inside the housing 11 and no air is sucked in, thereby ensuring adequate oil films.

Figure 3:
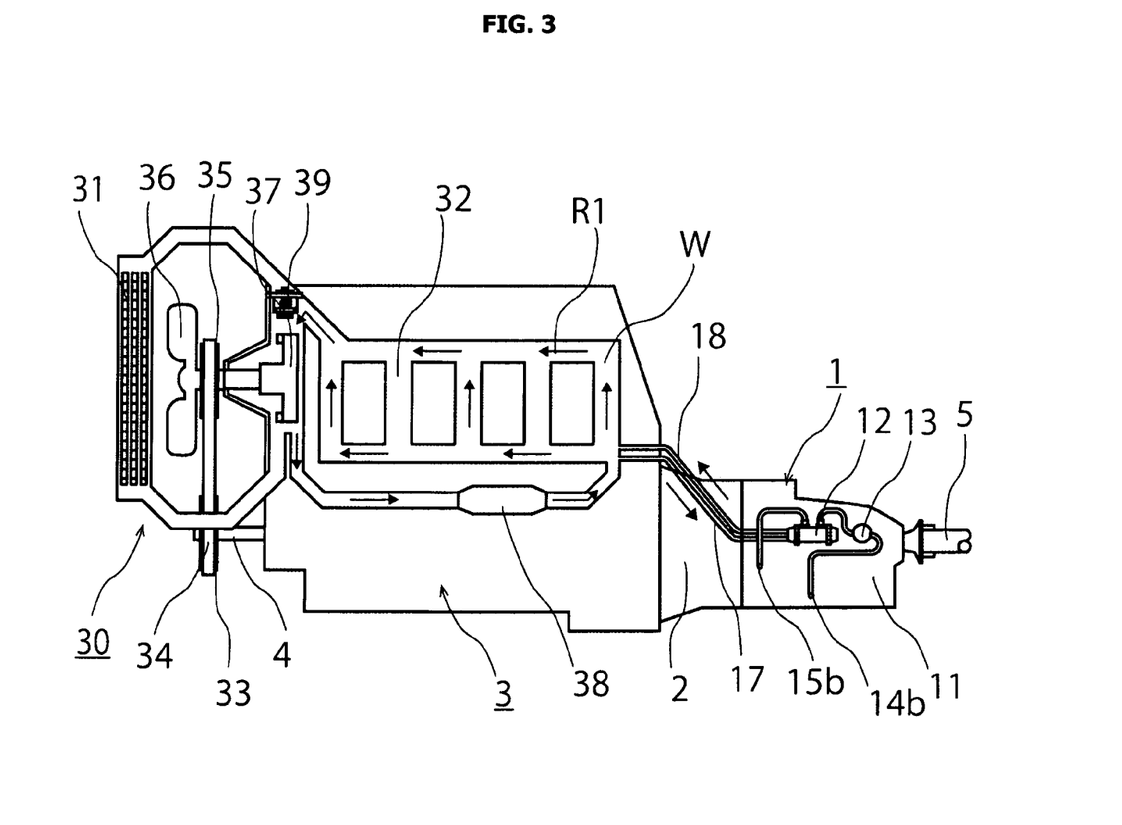
FIG. 3 is a side view showing cooling water for an internal combustion engine that is delivered into the gear device of an embodiment according to the present invention.

Next, a cooling system of the engine 3 will be described. As shown in FIG. 3, the engine 3 includes a water-cooling type cooling system 30. This cooling system 30 includes a radiator 31 and a water jacket 32. The cooling system 30 also includes a first pulley 33, a belt 34, a second pulley 35, a cooling fan 36, a water pump 37, an oil cooler 38, and a thermostat 39.

The thermostat 39 operates based on the temperature of the engine cooling water W and opens and closes a water path leading to the radiator 31. Generally, the thermostat 39 is provided for the purpose of accelerating warm-up of the engine 3, and is set at an opening degree of 10% when the temperature of the cooling water W is around 60° C. and at an opening degree of 100% when the temperature of the cooling water W is around 85° C., for example. The thermostat 39 operates such that the engine cooling water W passes through the radiator 31 only when the temperature of the cooling water W needs to be lowered.

FIG. 3 shows the operation of the thermostat 39 at the time of accelerating warm-up of the engine 3 and a flow passage R1 of the engine cooling water W during that operation. When the temperature of the engine cooling water W is low, the engine 3 is cold as well, and therefore the temperature of the lubricating oil in the engine 3 is likewise low. In this case, the engine 3 needs to be warmed up to an appropriate temperature to increase the combustion efficiency. To do so, the opening degree of the thermostat 39 is reduced to close its flow path, thereby preventing the engine cooling water W from passing through the radiator 31, and to form the flow passage R1 such that the engine cooling water W circulates only within the water jacket 32. The engine cooling water W circulates without being cooled down since it does not pass through the radiator 31.

During this operation, the temperature of the lubricating oil OL in the transmission 1 is low and the viscous resistance thereof is therefore high. Determining that the temperature of the lubricating oil OL detected by the oil temperature sensor 22 is low, the control device 20 increases the number of rotations of the circulation pump 13 to increase the amount by which to pump up the lubricating oil OL, so that the height of the level LO of the lubricating oil OL inside the housing 11 is lowered to a vicinity of the lowest oil level L2. Then, the engine cooling water W heated by the engine 3 flows into the heat exchanger 12 and acts in such a way as to raise the temperature of the lubricating oil OL.

In the above operations, the temperature of the lubricating oil OL is raised in the heat exchanger 12, and the amount of the lubricating oil OL retained in the oil pan 11a is reduced at the same time. Thus, an energy loss can be prevented which would otherwise occur due to viscous resistance resulting from a low temperature and excessively high viscosity of the lubricating oil OL, and that energy loss can further be prevented by the reduction of the amount of the oil. As a result, deterioration in fuel efficiency can be prevented.

Figure 4:
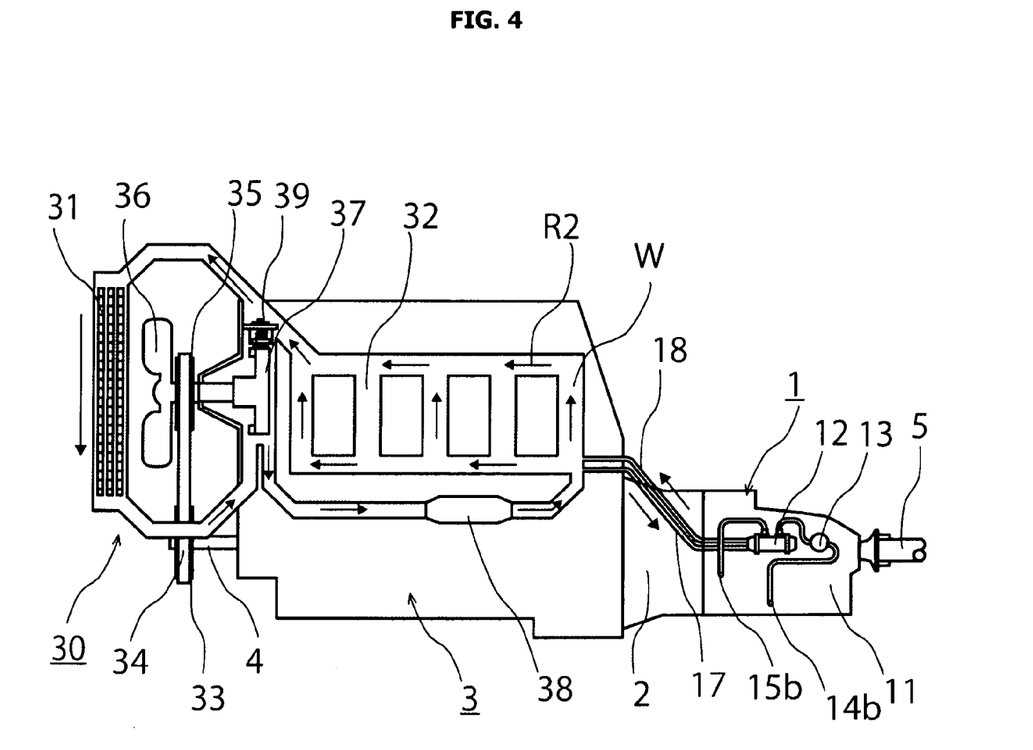
FIG. 4 is a side view showing the cooling water that is delivered into the gear device of the an embodiment according to the present invention through a radiator.

Meanwhile, FIG. 4 shows the operation of the thermostat 39 and a flow passage R2 of the engine cooling water W at the time of cooling down the engine 3 to prevent the engine 3 from being too hot. When the temperature of the engine cooling water W is high, the engine 3 is hot as well, and therefore the lubricating oil is likewise hot. When the lubricating oil is hot, the viscosity thereof is too low. Consequently, the oil films of the lubricating oil on the metal pieces become thin and the lubricating performance decreases significantly, hence causing wear and seizure. Thus, to prevent the lubricating oil from becoming too hot, the opening degree of the thermostat 39 is increased to open its flow path and form the flow passage R2 so that the engine cooling water W can pass through the radiator 31.

Operations of the cooling system 30 when the temperature of the engine cooling water W is high will be described. As the shaft 4 rotates, the first pulley 33 rotates, and the second pulley 35 rotates along with it. As the second pulley 35 rotates, the cooling fan 36 and the water pump 37 rotate. The cooling fan 36 blows air to the radiator 31 and cools down the engine cooling water W passing through the radiator 31. As the water pump 37 rotates, the engine cooling water W circulates within the water jacket 32. The engine cooling water W cools down the engine 3 since the engine cooling water W is cooled down when passing through the radiator 31.

In this operation, the temperature of the lubricating oil OL in the transmission 1 is also high. Thus, it is necessary to prevent the temperature of the oil from rising as in the case of the engine 3. In a condition where the lubricating oil OL is hot, the viscosity becomes low and the oil films become thin, thereby causing wear and seizure. Thus, to prevent the oil films from becoming thin, the control device 20 reduces the number of rotations of the circulation pump 13 to lower the amount by which to pump up the lubricating oil OL, so that the height of the level LO of the lubricating oil OL inside the housing 11 is raised to a vicinity of the highest oil level L1. Here, the engine cooling water W which has been relatively cooled down flows into the heat exchanger 12 and acts in such a way as to prevent the temperature of the lubricating oil OL from becoming too high.

In the above operations, the heat exchanger 12 can prevent the lubricating oil OL from being too hot, thereby preventing decrease in the viscosity of the lubricating oil OL. Accordingly, the lubricating performance can be maintained. In addition, a large amount of the lubricating oil OL is retained in the oil pan 11a to prevent the oil films from becoming thin. Accordingly, the cooling performance and the lubricating performance can be maintained.

In addition to the configuration described above, a pipe that leads the engine cooling water W cooled by the radiator 31 to the heat exchanger 12 may be provided in the case where the cooling performance of the lubricating oil OL is desired to be enhanced. A valve device may be provided such that which pipe to use is controlled according to the temperature of the oil. The pipes of the aforementioned configuration may be used to accelerate warm-up of the transmission 1 when the temperature of the lubricating oil OL is low, whereas the pipe connected directly from the radiator 31 may be used to lower the temperature of the lubricating oil OL when the temperature of the oil is high. By this configuration, when the temperature of the lubricating oil OL is high, the heat exchange can be done with cooler engine cooling water W, and the temperature of the oil can be lowered accordingly.

The gear device and the vehicle having the same mounted thereon of the present invention are capable of adjusting the temperature of oil and also adjusting the amount of the oil inside the gear device. Thus, with a synergistic effect of the oil temperature adjustment and the oil amount adjustment, it is possible to reduce problems originating from changes in the temperature of the lubricating oil, such as a drive loss due to viscous resistance resulting from a low oil temperature in particular, and therefore to prevent deterioration in fuel efficiency. Accordingly, the gear device and the vehicle having the same mounted thereon of the present invention can be applied to vehicles such as trucks.

The invention claimed is:

1. A device, comprising:
a gear device configured to supply lubricating oil from a lower part of an enclosure of the gear device to a heat exchanger by a circulation pump and causing the lubricating oil and cooling water for an internal combustion engine to exchange heat with each other in the heat exchanger, after which the lubricating oil retained in the lower part of the enclosure is churned by a plurality of pears of the gear device disposed in the enclosure,
wherein a level of the lubricating oil in the lower part of the enclosure when the circulation pump is stopped is defined as a highest oil level,
wherein the level of the lubricating oil in the lower part of the enclosure when an amount of the lubricating oil pumped out of the lower part of the enclosure by the circulation pump is maximum is defined as a lowest oil level,
wherein the heat exchanger is positioned outside the enclosure and at a level higher than the highest oil level, and
wherein the gear device further includes a control device configured, when the cooling water goes through a radiator, to bring the level of the lubricating oil in the lower part of the enclosure closer to the highest oil level by reducing a number of rotations of the circulation pump, and when the cooling water does not go through the radiator, to bring the level of the lubricating oil in the lower part of the enclosure closer to the lowest oil level by increasing the number of rotations of the circulation pump.

2. The gear device according to claim 1,
wherein the highest oil level is set higher than the lowest oil level,
wherein the gear device further includes:
a vehicle speed sensor which detects a speed of a vehicle equipped with the gear device;
an oil temperature sensor which detects a temperature of the lubricating oil; and
an oil amount level sensor which detects a height of the level of the lubricating oil in the lower part of the enclosure, and
wherein the control device includes a device for calculating an optimum oil temperature and an optimum oil height, and by comparing the optimum oil temperature and the detected oil temperature, and the optimum oil height and the detected oil height, the amount of the lubricating oil to be pumped out of the lower part of the enclosure by the circulation pump is adjusted according to the detected speed of the vehicle.

3. A vehicle having the gear device according to claim 2 mounted thereon.

4. The gear device according to claim 2, further comprising:
an outlet for removing the lubricating oil from the enclosure to be provided to the heat exchanger, said outlet being positioned lower than the lowest oil level in the enclosure, and
an inlet for receiving the lubricating oil from the heat exchanger to be provided to the enclosure, said inlet being positioned higher than the highest oil level in the enclosure,
wherein the lubricating oil is pumped into the lower part of the enclosure through the inlet along an inner wall of the enclosure.

5. The gear device according to claim 1, wherein the cooling water is cooling water heated by the internal combustion engine, and
the control device includes a device for controlling the amount of the lubricating oil to be pumped out of the lower part of the enclosure by the circulating pump so as to raise a temperature of the lubricating oil and lower the level of the lubricating oil in the lower part of the enclosure to a vicinity of the lowest oil level at cold start of the internal combustion engine.

6. A vehicle having the gear device according to claim 5 mounted thereon.

7. The gear device according to claim 5, further comprising:
an outlet for removing the lubricating oil from the enclosure to be provided to the heat exchanger, said outlet being positioned lower than the lowest oil level in the enclosure, and
an inlet for receiving the lubricating oil from the heat exchanger to be provided to the enclosure, said inlet being positioned higher than the highest oil level in the enclosure,
wherein the lubricating oil is pumped into the lower part of the enclosure through the inlet along an inner wall of the enclosure.

8. A vehicle having the gear device according to claim 1 mounted thereon.

9. The gear device according to claim 1, further comprising:
an outlet for removing the lubricating oil from the enclosure to be provided to the heat exchanger, said outlet being positioned lower than the lowest oil level in the enclosure, and
an inlet for receiving the lubricating oil from the heat exchanger to be provided to the enclosure, said inlet being positioned higher than the highest oil level in the enclosure,
wherein the lubricating oil is pumped into the lower part of the enclosure through the inlet along an inner wall of the enclosure.

* * * * *